United States Patent
Mohanty et al.

(10) Patent No.: US 7,310,974 B2
(45) Date of Patent: Dec. 25, 2007

(54) METHOD FOR PRODUCING TWISTED OPTICAL FIBER WITH REDUCED POLARIZATION MODE DISPERSION

(75) Inventors: Sangeeta Mohanty, Maharastra (IN); Nacham Sridhar, Maharastra (IN); Salaj Sinha, Maharastra (IN); Nitesh Gulati, Maharastra (IN); Sthitadhi Das, Maharastra (IN)

(73) Assignee: Sterlite Optical Technologies Limited, Maharastra (IN)

( * ) Notice: Subject to any disclaimer, the term of this patent is extended or adjusted under 35 U.S.C. 154(b) by 580 days.

(21) Appl. No.: 10/754,904

(22) Filed: Jan. 9, 2004

(65) Prior Publication Data

US 2004/0163418 A1 Aug. 26, 2004

(30) Foreign Application Priority Data

Jan. 13, 2003 (IN) .......................... 38/MUM/2003

(51) Int. Cl.
*C03B 37/022* (2006.01)
(52) U.S. Cl. ........................................ 65/402; 65/438
(58) Field of Classification Search ................. 65/404, 65/438, 430
See application file for complete search history.

(56) References Cited

U.S. PATENT DOCUMENTS

| | | | |
|---|---|---|---|
| 4,473,273 A | | 9/1984 | Hodge |
| 5,897,680 A | * | 4/1999 | Geertman ..................... 65/402 |
| 2001/0020374 A1 | * | 9/2001 | Roba et al. ................... 65/402 |
| 2003/0010066 A1 | * | 1/2003 | Sasaoka et al. .............. 65/402 |
| 2004/0107734 A1 | * | 6/2004 | Kenkare et al. .............. 65/378 |

* cited by examiner

*Primary Examiner*—Steven P. Griffin
*Assistant Examiner*—Queenie Dehghan
(74) *Attorney, Agent, or Firm*—Ladas & Parry LLP

(57) ABSTRACT

A method for drawing an optical fiber having reduced polarization mode dispersion (PMD) draws an optical fiber from an optical fiber preform whose core ovality is at max about 3%, coats the optical fiber with acrylic polymer and twists the coated optical fiber with a pair of spinning wheels. The twisting of the fiber is achieved by four discrete spin rates that repeat in a periodic fashion after the drawing of certain lengths of the optical fiber. At least one of the spin rates varies in a trapezoidal manner along the respective one of drawn lengths of the optical fiber.

11 Claims, 3 Drawing Sheets

METHOD FOR PRODUCING TWISTED OPTICAL FIBER WITH REDUCED POLARIZATION MODE DISPERSION

BACKGROUND OF INVENTION

1. Field of Invention

The present invention relates to a method for drawing an optical fiber having reduced polarization mode dispersion (PMD). The present invention also relates to the single mode optical fiber made in accordance with the presently disclosed method.

Single mode optical fiber commonly used in communication systems is not purely single mode. Rather, two modes, with perpendicular polarizations, exist in single mode fiber. These two polarizations form an orthogonal basis set. Accordingly, any configuration of light that propagates through a single mode fiber can be represented by a linear superposition of these two modes.

If the fiber has perfect circular symmetry in both geometry and internal applied stress, the two polarization modes propagate with the same group velocity. They have no time delay difference after traveling the same distance in the fiber. But a practical fiber does not have perfect circular symmetry. Imperfections such as geometric deformation and stress asymmetry makes the two polarization modes to propagate with different velocities (a function of propagation constant). The difference between the propagation constants is termed as birefringence. The differential time delay between the two polarization modes is called PMD (polarization mode dispersion). This limits the high bit rate transmission in the communication system.

2. Description of Prior Art

According to prior art of spinning the fiber mentioned in U.S. Pat. No. 5,418,881; the fiber is subjected to a sinusoidal spin function, which varies with the spatial distance of the fiber drawn. However, this patent does not teach about the discrete spin rates and a trapezoidal wave function of the spin rate with the spatial distance of the fiber.

In another published PCT application bearing No. WO/97/26221, the authors have identified the disadvantage of above-cited U.S. Pat. No. 5,418,881. The major disadvantage identified is being in the difference of beat lengths along the different lengths of the fiber. A particular combination of spin amplitude and spin frequency will lower the PMD effectively for a particular beat length. However, this published PCT application WO/97/26221 does not teach the manner for spinning the fiber, particularly after coating and twisting the fiber so as to achieve effective lowering of the PMD of the fiber, particularly cabled fiber. The author of this published PCT application has not visualized that the use of combination of discrete spin rates of different values, which repeats itself in a periodic fashion can effectively lower the PMD of the cabled fiber.

The present invention now makes a disclosure of a method by which it is possible to achieve the reduced PMD in optical fiber as low as less than about 0.1 ps/$\sqrt{km}$ and the post cabling PMD to be as low as less than about 0.3 ps/$\sqrt{km}$ when the spinning is performed on a fiber, particularly on a drawn, coated and twisted fiber by employing the spin function, which is a combination of four discrete spin rates which repeat itself in a periodic fashion after a certain length of the fiber drawn and the spin rate of each spin function varies in a trapezoidal manner along the drawn length of fiber. The fibers drawn from performs in accordance with the method of the present invention have ovality at max about 3%.

SUMMARY OF THE INVENTION

Accordingly, the main object of the present invention is to provide a method for effectively reducing PMD in the fiber after drawing and in post cabling stage. The method uses an experimental technique of determining the discrete spin functions. These spin functions are made to vary in a periodic fashion with the length of fiber to achieve the PMD of the fiber after cabling to be as low as less than about 0.3 ps/$\sqrt{km}$. Due to mechanical stresses generated during cabling the PMD value of fiber increases after cabling. The present invention describes a method in which a discrete spin function is used to effectively reduce the PMD of the fiber in post cabling stage.

Accordingly, the present invention relates to a method for drawing an optical fiber having effectively reduced polarization mode dispersion (PMD) as low as less than about 0.1 ps/$\sqrt{km}$ and the post cabling PMD as low as less than about 0.3 ps/$\sqrt{km}$.

In accordance with the preferred embodiment of the present invention the spinning is performed on a fiber, particularly on a drawn, coated and twisted fiber by employing the spin function, which is a combination of four discrete spin rates which repeat itself in a periodic fashion after a certain length of the fiber drawn and the spin rate of each such spin function varies in a trapezoidal manner along the drawn length of fiber.

The fibers drawn from performs in accordance with the method of the present invention have ovality at max about 3%.

The effective lowering of PMD is achieved in accordance with the present invention by providing spin functions characterized by:

(a) The maximum spin rate is less than about 15 spins/meter
(b) The spin function is a trapezoidal spin function.
(c) A defined change sequence of discrete spin rates.
(d) The combination of discrete spin rates which repeats itself after a specific spatial distance.
(e) Draw speed range varies from about 10 to about 23 meters/sec The other objects and the preferred embodiments of the present invention will become more apparent from the following description when read in combination with the accompanying drawings which are not intended to limit the scope of the present invention.

BRIEF DESCRIPTION OF THE ACCOMPANYING DRAWINGS

DETAIL DESCRIPTION OF THE PREFERRED INVENTION

Figure 1:
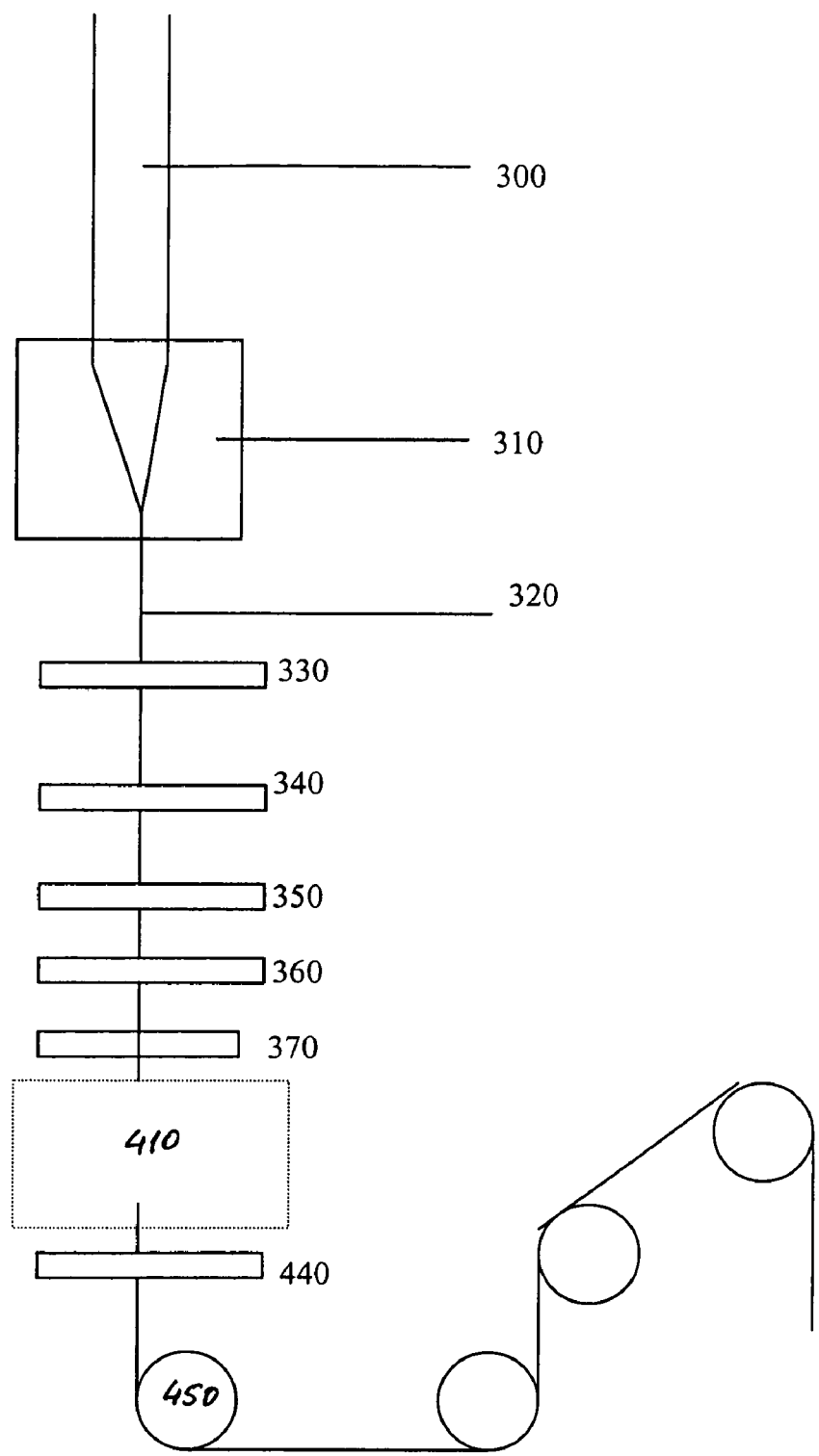
FIG. 1 shows a schematic diagram of the fiber draw apparatus in accordance with the preferred embodiment of the present invention.

The present invention relates to a method of effectively reducing PMD in the fiber post drawn and post cabling stage by variably spinning the fiber during the drawing process. The process of spinning is done with the help of spinning wheels, which imparts a twist to the coated fiber. This twist gets impressed in the fiber near the hot zone.

Now referring to the accompanying drawings, FIG. 1 shows the schematic diagram of the draw tower where the preform is drawn to fiber. An optical fiber preform 300 is fed into a drawing furnace 310 for softening by heating. An optical fiber 320 is drawn form one end of the softened optical fiber preform 300. The drawn optical fiber 320 is passed through a coating unit 340 via a diameter monitor 330, to be coated with a polymer coating by a coating unit 340. Then the optical fiber 320 is preferably sequentially passed through a coating concentricity monitor 350, a coating resin setting unit 360 e.g. UV lamp, and a coating diameter monitor 370.

Figure 2:
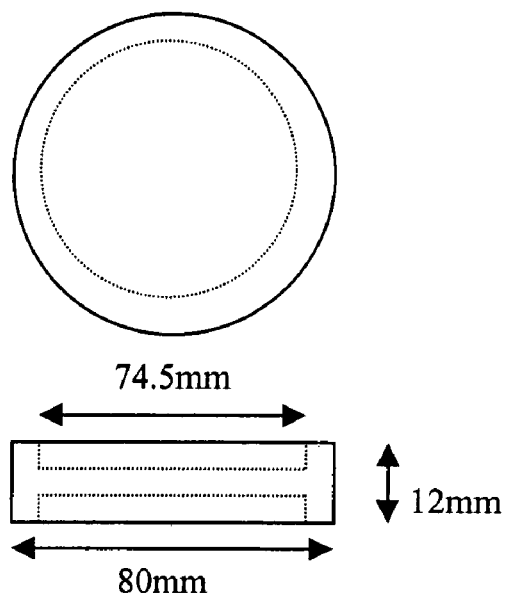
FIG. 2 shows a schematic diagram of a spinning/guiding wheel in accordance with the preferred embodiment of the present invention.
Figure 3:
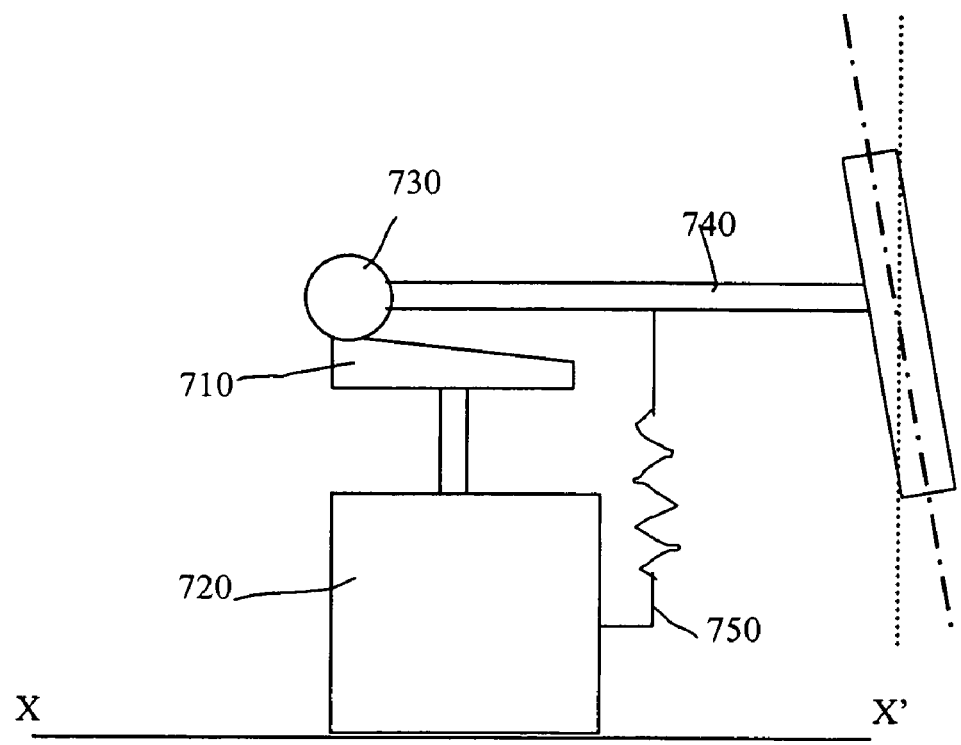
FIG. 3 shows a schematic diagram of spinning wheel swing mechanism in accordance with the preferred embodiment of the present invention.

Subsequently, the optical fiber 320 is passed through a Fiber Spinning Unit (FSU) 410. Although any fiber spinning unit may be used in the presently disclosed invention. However, in accordance with the preferred embodiment of the present invention, the fiber spinning unit comprises of four wheels one servomotor to control the spinning of the wheels. Out of four wheels two are guiding wheels and two are spinning wheels. These two guiding wheels are on the upper side of the unit and they guide the fiber during normal run. According to this invention, the lower pair of wheels are spinning wheels, these wheels directly touch the fiber during draw. FIG. 2 shows a schematic diagram of a spinning wheels/guiding wheels. According to the preferred embodiment of this invention, the diameter of the wheel is of the order of about 80 mm, the width of the wheel on which the fiber spins is about 12 mm, and a flange is curved out of the wheel as shown in FIG. 2. Further, the depth and thickness of the flange are about 5.66 mm and about 2.8 mm respectively.

In accordance with this invention, during drawing, the gap between the guiding wheels is maintained at about 3 mm. This gap is maintained to prevent the slip of the fiber on the spinning wheels. Further, the distance between the spinning wheels is kept at about 0.3 mm. The height difference between the centers of guiding and spinning wheels is maintained at about 50 mm. According to this invention, during spinning of fiber, the compression force is maintained in the range varying from about 0.7 to about 1.2 N. This force can be adjusted in the conventional manner. However, according to this invention it is adjusted with the spring attached to the wheels. The clockwise and anticlockwise motion of the spinning wheel is driven by means of a tilting plate 710. The tilting plate 710 is a circular plate whose thickness varies along the circumference. The tilting plate is supported on a non-moving base 720. The spinning wheel is connected to a contact roller 730 with a rod 740. The contact roller moves on the circumference of the tilting plate 710. There is a spring 750 that connects the rod 740 to the base 720. The spring force given by the spring 750 provides the flexible movement of the rod about an axis at the contact roller. During the rotation of the tilting plate the contact roller 730 moves up and down with respect to the horizontal reference plane XX'. This motion in turn gives an up and down motion to the rod 740. Thus the spinning wheel gets a swing motion. The servomotor is coupled with the drive, which receives a feedback from the PLC attached with the system. All Process parameters to rotate the wheels like clockwise angle and counter clockwise angle for different ranges of length can be set on user friendly MMI. This FSU is mounted on a table. The horizontal and vertical alignment of the system can be done. In the normal run the alignment of the FSU is important, any misalignment may generate vibration in the fiber resulting in wrong reading in the Bubble detector mounted below FSU or bad coating application.

In accordance with the present invention, the fiber then passes through a flaw detector 440. The optical fiber 320 after passing through the flaw detector 440 runs through the capstan 450. The optical fiber 320 then is passed onto a take up spool with a set of guide rollers.

The spin rate of the presently disclosed method results in effectively reduced PMD value which is as low as less than about 0.3 ps/√km at post cabling stage. The spin function of the presently disclosed method also results in draw speed ranging between about 10 to about 23 meters/sec.

Figure 5:
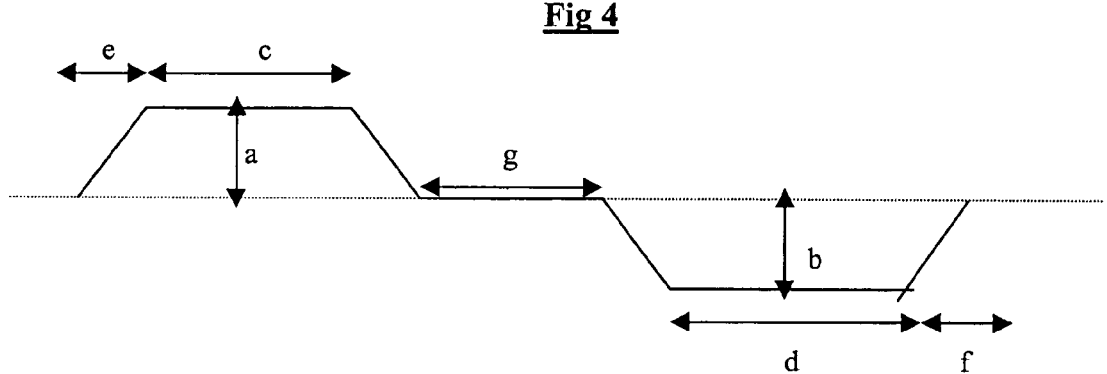
FIG. 5 shows a trapezoidal spin function and the different recipe parameters used to define it in accordance with the preferred embodiment of the present invention.
Figure 6:
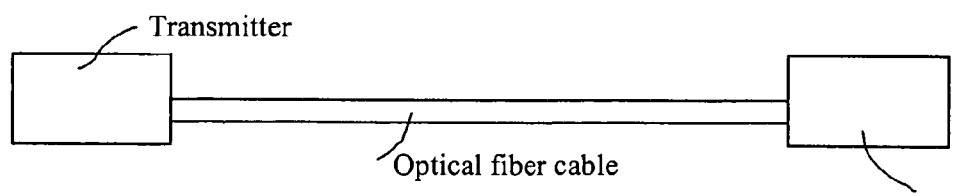
FIG. 6 shows a schematic diagram of an optical communication link in accordance with the preferred embodiment of the present invention.

The different parameters used in the recipe of the presently disclosed method are shown in FIG. 5. The spin function in accordance with the present invention has a trapezoidal shape with the following parameters:

a) Spin per meter clockwise [1/m] It is constant spin rate in the clockwise direction.
b) Spin per meter counter clockwise [1/m] It is constant spin rate in counter clockwise direction.
c) Spin length clockwise [m] Spatial length of fiber subjected to clockwise spinning.
d) Spin length counter clockwise [m] Spatial length of fiber subjected to counter clockwise spinning.
e) Swivel Length Clockwise [m] Spatial length of fiber spun during transition of spinning wheel (rotating in clockwise direction) from current position to set position.
f) Swivel Length Counter Clockwise [m] Spatial length of fiber spun during transition of spinning wheel (rotating in anticlockwise direction) from current position to set position.
g) Straight length [m]. Spatial length of fiber not subjected to any twist by the spinning wheel.

Figure 4:
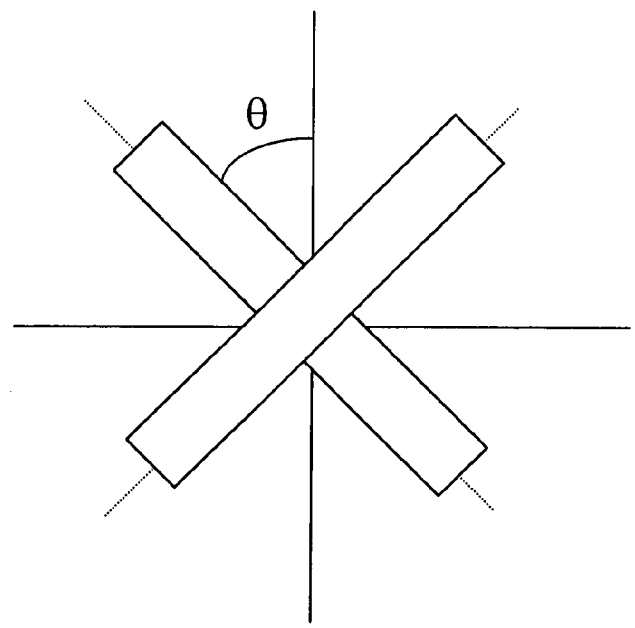
FIG. 4 shows a schematic diagram of the spinning wheels in the displaced position in accordance with the preferred embodiment of the present invention.

The amplitude of rotation is directly proportional to the spin rate and is given by the relation (1):

$$\theta = K(\text{spin rate}) \quad (1)$$

where θ [FIG. 4] is the amplitude of swing motion and K is a constant. This implies that when the spin rate increases the angle of maximum rotation also increases and vice versa.

According to the present invention, the speed of the angular motion of the spinning wheel is dependent on the line speed, swivel length and the spin rate. The relation between them is as shown below by the relation (2):

$$\text{Angular speed} = K'^*(\text{spin rate})^*(\text{drawing speed})/(\text{swivel length}) \quad (2)$$

where K' is a constant.

In accordance with the present invention the presently disclosed method for drawing an optical fiber having reducing polarization mode dispersion (PMD) comprises the steps of:

a) drawing an optical fiber from an optical fiber preform whose core ovality is at max about 3%;

b) coating the optical fiber with acrylic polymer;
c) twisting the coated optical fiber with a pair of spinning wheels;
d) the step of spinning the fiber is characterized by that:
   (i) the spin function used to spin the fiber is a combination of four discrete spin rates which repeat itself in a periodic fashion after a certain length of fiber drawn; and
   (ii) the spin rate of each spin function varies in a trapezoidal manner along the drawn length of the fiber.

According to the present invention, the combination of four discrete spin functions repeats after a specific length in the range varying between about 800-1200 meters. The cabled fiber PMD achieved has a minimum of about 99.0% compliance with about 0.3-ps/√km. The fiber drawing speed varies from about 10 to about 23 meters/sec. The coated optical fiber diameter is in the range varying from about 240 to about 250 micron. The gap between the two guiding wheels is at least about 0.3 mm. The gap between the two spinning wheels is at max about 0.35 mm. The difference between gap of spinning wheels and coated fiber diameter is in the range varying from about 30 to about 100 micron for achieving a compression force in the range varying from about 0.7 to about 1.2 N. The distance between the centers of the guiding wheels and the spinning wheels is at least about 45 mm. The distance between the spinning roller and capstan is less than about 35 cm for efficient damping of vibration of the fiber.

In accordance with the present invention, the single mode optical fiber made in accordance with the presently disclosed method is also provided.

The single mode optical fiber is used in the optical communication system consisting of a transmitter and receiver.

The experimental study was carried out in 13 stages with different spin functions to achieve the effectively reduced PMD of the fiber. The fiber drawn with different spin functions were cabled. The PMD of the cabled fiber was measured and these values were used as feedback to modify the spin function.

The first spin function and the cable fiber results are as follows:

TABLE 1(a)

Spin function for Stage No 1

|  | Clockwise | Counter clockwise |
|---|---|---|
| Spins per meter | 8 | 8 |
| Spin length | 8 | 8 |
| Swivel length | 2 | 2 |
| Straight length |  | 1 |

TABLE # 1(b)

PMD of Cabled fiber of Stage No 1

| Preform core ovality | SPECS (0.3) |
|---|---|
| <=2.0% | 94.1% |
| <=3.0% | 93.8% |

Eight different single spin functions were experimented to achieve highest percentage of cabled fiber meeting the about 0.3-ps/√km specification of PMD.

Table 2(a) shows the spin function with which the inventors were able to achieve the best results in the cabled fiber PMD using single spin function.

TABLE 2(a)

|  | Clockwise | Counter clockwise |
|---|---|---|
| Spins per meter | 10 | 10 |
| Spin length | 16 | 16 |
| Swivel length | 1 | 1 |
| Straight length |  | 1 |

TABLE 2(b)

Cabled fiber PMD results.

| Preform core ovality | SPECS (0.3) |
|---|---|
| <=2.0% | 98.4% |
| <=3.0% | 97.2% |

As stated hereinabove, the PMD results the percentage compliance to the desired PMD value of about 0.3-ps/√km was low, the inventors experimented on a combination of four different spin rates to achieve the effectively reduced PMD of the fiber. These spin rates were repeated in a definite sequence to effectively lower the PMD of the fiber. The inventors merged the best of single spin rate functions.

It was observed on experimenting five different combinations of different spin functions that the combination which resulted in best compliance of cabled fiber PMD (<about 0.3 ps/√km) is as given in Table No. 3(a). It was also observed that this spin function works well for a drawing speed ranging between about 10 to about 23 meters/sec.

TABLE No 3(a)

|  | Recipe # 1 | Recipe # 2 | Recipe # 3 | Recipe # 4 |
|---|---|---|---|---|
| Spins/meter CW | 10 | 7 | 12 | 9 |
| Spins/meter CCW | 10 | 7 | 12 | 9 |
| Spin length CW | 16 | 9 | 8 | 5 |
| Spin length CCW | 16 | 9 | 8 | 5 |
| Swivel length CW | 1 | 1 | 4 | 3 |
| Swivel length CCW | 1 | 1 | 4 | 3 |
| Straight length | 1 | 0 | 1 | 0 |
| Repeat Gain | 7 | 11 | 8 | 11 |
| Meters/cycle | 37 | 22 | 33 | 22 |
| M/Repeat cycle | 259 | 242 | 264 | 242 |

The structure of the recipe is designed such that recipe # 1 is continued for the times mentioned in repeat gain and then switch to recipe 2. This process continues till recipe # 4 is completed. The complete recipe finishes within a length of about 1000 meters of fiber drawn. The above recipe is independent of drawing speed and has shown good compliance with cabled fiber PMD.

The results of the cabled fiber spun with the above recipe are given in Table 3(b).

TABLE No 3(b)

| Preform core ovality | SPECS (0.3) |
|---|---|
| <=2.0% | 99.6% |
| <=3.0% | 99.1% |

The present invention, therefore, provides a fiber spinning method, which uses a combination of four different spin rates, which repeats itself after a length of about 1000 meters. This method ensures about 99.1% compliance of cabled fiber PMD.

The results mentioned in above Table No 3(b) shows a better compliance of PMD for preforms having core ovality less than about 2%. This cannot be practiced on a production scale, as it would lead to increase in preforms rejection. Hence, in accordance with the present invention the preforms were qualified in accordance with the specification of less than or equal to about 3% core ovality.

The present invention has been described and illustrated with the help of accompanying drawings which are not intended to limit the scope of the present invention. It is obvious to the persons skilled in the art that it is possible to modify the disclosed method without deviating from the scope of the present invention. Accordingly, such modifications are intended to be included in the scope of the present invention. The present invention is restricted with the following claims.

The invention claimed is:

1. A method for producing twisted optical fiber having reduced polarization mode dispersion (PMD) comprising the steps of:
    a) drawing an optical fiber from an optical fiber preform, wherein the preform has a core ovality that is at max about 3%;
    b) coating the optical fiber with acrylic polymer;
    c) twisting the coated optical fiber with a pair of spinning wheels and
    d) cabling he coated optical fiber to form a cabled fiber;
    wherein the step of twisting the coated optical fiber comprises spinning the coated optical fiber according to a spin function, wherein the spin function comprises a plurality of recipes, each of the recipes comprising a plurality of spins/meter in a clockwise direction, a plurality of spins/meter in a counterclockwise direction, a spin length in the clockwise direction, a swivel length in the counterclockwise direction, optionally a straight length, a plurality of repeat cycles and a total length for the repeat cycles, said recipes being selected such that the cabled fiber formed from the coated optical fiber twisted in step (c) has a polarization mode dispersion as low as less than about 0.3-ps/$\sqrt{km}$.

2. A method according to claim 1, wherein the polarization mode dispersion of the cabled fiber has a minimum of about 99.0% compliance with about 0.3-ps/$\sqrt{km}$.

3. A method according to claim 1, wherein each of the recipes comprises a fiber drawing speed that varies from about 10 to about 23 meters/sec.

4. A method according to claim 1, wherein the coated optical fiber in step (c) has a diameter that is in the range varying from about 240 to about 250 micron.

5. A method according to claim 1, wherein the twisting in step (c) is effected in a fiber spin unit comprising the spinning wheels and a plurality of guiding wheels, the guiding wheels being separated by a gap of at least about 0.3 mm.

6. A method according to claim 1, wherein a gap between the pair of spinning wheels is at max about 0.35 mm.

7. A method according to claim 6, wherein a difference between the gap between the spinning wheels and a diameter of the coated fiber is in a range from about 30 to about 100 micron for achieving a compression force in a range from about 0.7 to about 1.2N.

8. A method according to claim 6, wherein a distance between respective centers of the a plurality of guiding wheels and the spinning wheels is at least about 45 mm.

9. A method according to claim 1, wherein after the twisting step, the coated optical fiber passes through a capstan, a distance between the spinning wheels and the capstan is less than about 35 cm for efficient damping of vibration of the coated optical fiber.

10. A method according to claim 1, wherein each of the spin function is a combination of four discrete spin rates, which the combination repeats in a periodic fashion after a certain length of the optical fiber is drawn, and the spin function of recipes has a spin rate that varies in a trapezoidal manner along a drawn length of the coated optical fiber.

11. A method according to claim 10, wherein the spin function comprises a combination of four discrete spin function that repeats after a specific length in the range varying between about 800-1200 meters.

* * * * *